United States Patent Office 3,193,719
Patented July 6, 1965

3,193,719
DEMOUNTABLE MAGNETIC FOCUSSING SYSTEM FOR A TRAVELING-WAVE TUBE
John Morland Winwood, Salfords, Hewson Nicholas Graham King, Newdigate, and Roger Woodford Kersey, Edenbridge, England, assignors to North American Philips Company, Inc., New York, N.Y., a corporation of Delaware
Filed Apr. 11, 1960, Ser. No. 21,230
Claims priority, application Great Britain, Apr. 13, 1959, 12,440/59
4 Claims. (Cl. 315—3.5)

This invention relates to arrangements with travelling-wave tube, comprising a magnetic focussing system having its axis coincident with that of the travelling-wave tube. It also concerns travelling-wave tubes intended for such arrangements.

In aligning a travelling-wave tube within a magnetic focussing system, it is important to arrange the tube so that the delay line in the tube is struck by electrons from the beam to the least possible extent, especially at the input end of the delay line, in order to ensure a minimum noise level of the tube.

A minimum noise level cannot be obtained merely by adjusting the position of the tube relative to the focussing system so as to obtain a minimum flow of electrons to the delay line. Correct adjustment of the tube can only be carried out with the aid of complicated testing equipment which in general is not available to the users of such tubes. Thus, the correct adjustment can usually be only carried out by the manufacturer.

The consequence of the foregoing would imply that the users must not keep spare tubes in stock, but tubes adjusted in the focussing system, which involves considerable inconvenience. The tube itself comprises only a small part of the weight and volume of the assembly and, on the other hand, the cost of the focussing system is not to be neglected.

Arrangements having a travelling-wave tube are already known wherein a plurality of soft-iron rings are so arranged between the pole pieces of the permanent-magnetic focussing system as to obtain a homogeneous field at the area of the travelling-wave tube. In such arrangements it is likewise necessary for the position of the tube to be accurately adjusted with respect to the focussing system.

An object of the invention is to provide an arrangement and travelling-wave tubes intended therefor which simplify the change of tubes.

According to the invention, in an arrangement with a travelling-wave tube, comprising a magnetic focussing system having its axis coincident with that of the travelling-wave tube and wherein a plurality of soft-iron rings are arranged within the focussing system in order to homogenize the magnetic field, the soft-iron homogenizing rings are rigidly connected to the travelling-wave tube, whilst the assembly of travelling-wave tube and homogenizing rings is fixed in position with respect to the magnetic system with the aid of reference surfaces.

The invention is based upon recognition of the fact that the position of the travelling-wave tube relative to the focussing rings is considerably more critical than the position of the focussing rings relative to the magnetic system. This applies to both a permanent-magnetic system and an electromagnetic system. Fixation of a travelling-wave tube with the aid of reference surfaces with respect to the focussing rings, is, with the usual accuracies, not sufficient to ensure correct adjustment of the tube, whereas such is the case for the focussing rings with respect to the magnetic system.

With the arrangement according to the invention, it is thus possible to change the assembly of travelling-wave tube and focussing rings without further adjustment of the position of the travelling-wave tube being necessary, so that such change can be carried out more rapidly and by less skilled labour. True, the tubes which have to be kept in stock with this system are heavier and larger due to the focussing rings surrounding them than are the bare tubes, but still relatively small in volume and weight as compared with the complete assembly, whilst on the other hand the advantage is obtained that, in handling, the vacuous envelope is not damaged so easily as is the case with prior systems.

Travelling-wave tubes according to the invention with homogenizing rings rigidly surrounding them may be cemented together as a unit or may be assembled by means of adjusting screws.

In order that the invention may be readily carried into effect, it will now be described in detail, by way of example, with reference to the accompanying diagrammatic drawings, in which.

Figure 1:
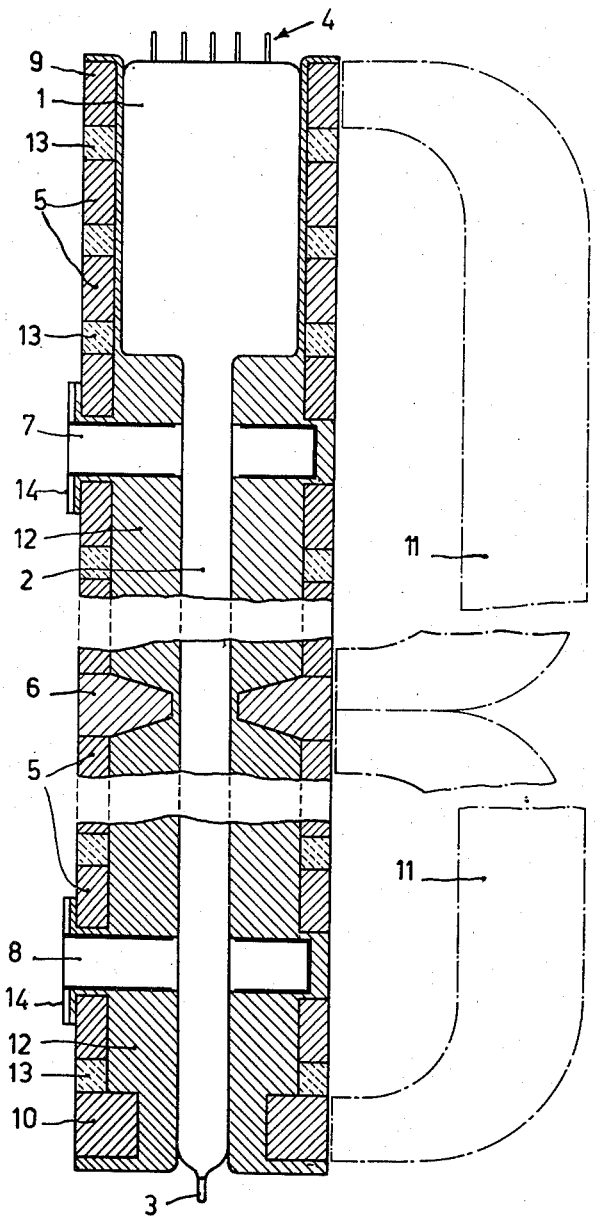
FIG. 1 shows part of an arrangement according to the invention.

Referring now to FIG. 1, the glass envelope of a travelling-wave tube comprises a wide portion 1, which surrounds the electron gun, and a portion 2 which embraces the delay line and the collector. Electrical connections 3 and 4 are provided at the collector side and the gun side respectively. Arranged coaxially with the tube are a plurality of soft-magnetic focussing rings 5, an annular pole piece 6 at the centre of the tube and two pole pieces 9 and 10 at its ends. A magnetic system 11, which is shown in dot-and-dash lines at only one side of the tube, is of the type wherein oppositely-directed fields are present in the two halves of the travelling-wave tube. The input and output wave guides are indicated by 7 and 8 respectively. The travelling-wave tube, the homogenizing rings 5, the pole pieces 6, 9 and 10 and the input and output wave-guides 7 and 8 are held rigidly together by a filler 12 of hardenable material, such as a thermosetting synthetic resin, or a resin of the epoxy type which hardens in air. Rings 13 of non-magnetic material, such as brass, are provided between the focussing rings, but rigidly connected thereto. The input and output guides 7 and 8 are each provided with a flange 14 for further connection.

The assembly of travelling-wave tube and homogenizing rings and pole pieces is built up as follows. The soft-magnetic parts 5, 6, 9 and 10, together with the non-magnetic parts 13 and the wave guides 7 and 8, are placed by means of a yoke against the reference surfaces of the magnetic system of a test arrangement. Subsequently, a travelling-wave tube is introduced into this assembly and positioned so that the tube has its optimum performance with regard to noise and current to the delay line. Next, the filler 12 is introduced into the space between the tube and the surrounding parts, which filler is allowed to harden. After any excess material 12 has been removed, the assembly may be arranged in any suitable magnetic system without further adjustment being required. The pole pieces 9 and 10 may serve as reference surfaces.

Figure 2:
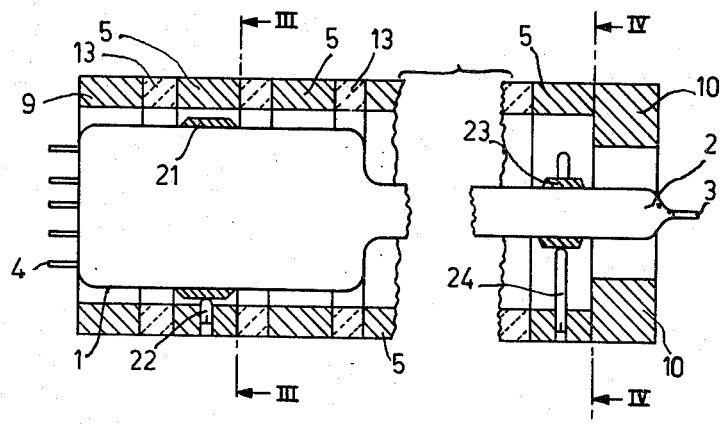
FIG. 2 shows a tube of different design for such an arrangement.

In FIG. 2, component parts identical with those of FIG. 1 are indicated by the same reference numerals. In this embodiment, the tube is maintained in position within the system of focussing rings 5 and non-magnetic rings 13 by means of arcuate clamps 21 at the gun side of the tube, which are pressed against the envelope by means of adjusting screws 22, and arcuate clamps 23 and adjusting screws 24 at the collector side.

Figure 3:
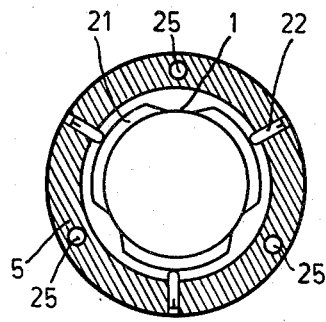
FIGS. 3 and 4 show two cross-sections of FIG. 2.
Figure 4:
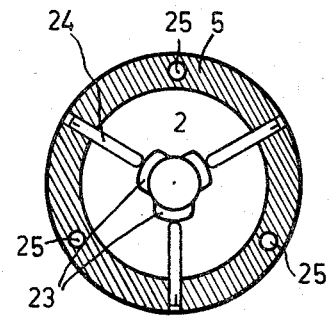

FIGS. 3 and 4 show cross-sections of FIG. 2 in planes III—III and IV—IV respectively. The focussing rings 5 and the non-magnetic rings 13 may be secured together and to the pole pieces 9 and 10 with the aid of an adhesive, such as an epoxy resin, or by means of copper pull rods as indicated by 25. In FIGS. 3 and 4, these component parts may clamp against one another.

What is claimed is:

1. The combination of a travelling wave tube and an external demountable magnetic focussing system therefor coaxial with the axis of the tube, said focussing system comprising an external demountable component serving as a source of magnetic flux and further comprising a plurality of soft iron rings positioned around the tube for homogenizing the magnetic field applied thereto, said tube and said rings being fixedly positioned relative to each other to form a rigid assembly provided with fixed reference surfaces of magnetic material for engaging cooperating surfaces of magnetic material of said demountable component.

2. The combination of a travelling wave tube comprising an envelope and an external, demountable magnetic focussing system which is coaxial with the axis of the tube, said focussing system comprising an external demountable component serving as a source of magnetic flux and further comprising a plurality of spaced soft-iron rings for homogenizing the magnetic field applied thereto, output and input wave-guides for coupling said tube to a load and source of energy, respectively, said envelope and said rings and said wave-guides being fixedly positioned relative to each other to form a rigid assembly provided with fixed reference surfaces of magnetic material for engaging cooperating surfaces of magnetic material of said demountable component.

3. The combination as claimed in claim 2 in which the wave-guides, soft-iron rings and magnetic focussing system are secured, in fixed position relative to the tube, to the envelope with a hardenable material.

4. The combination as claimed in claim 3 in which the hardenable material is an epoxy resin.

References Cited by the Examiner

UNITED STATES PATENTS

| | | | |
|---|---|---|---|
| 2,812,470 | 11/57 | Cook et al. | 315—3.5 |
| 2,871,395 | 1/59 | Cioffi | 313—84 X |
| 2,942,141 | 6/60 | Cutler | 313—84 X |
| 2,944,182 | 7/60 | Rigrod | 313—84 X |
| 2,984,762 | 5/61 | Hass | 315—3.5 |
| 2,992,348 | 7/61 | Okstein | 315—3.5 X |
| 3,013,173 | 12/61 | Sturrock | 313—84 |
| 3,020,444 | 2/62 | Wolkstein | 315—3.6 X |

FOREIGN PATENTS

| | | |
|---|---|---|
| 648,291 | 1/51 | Great Britain. |
| 891,985 | 5/59 | Great Britain. |

GEORGE N. WESTBY, *Primary Examiner.*

RALPH G. NILSON, ARTHUR GAUSS, *Examiners.*